Patented June 15, 1954

2,681,338

UNITED STATES PATENT OFFICE 2,681,338

AZO COLORING SALTS

Francis Russell Harrison and Harry James Twitchett, Blackley, Manchester, England, assignors to Imperial Chemical Industries Limited, a corporation of Great Britain No Drawing. Application April 16, 1951, Serial No. 221,312

Claims priority, application Great Britain April 24, 1950

5 Claims. (Cl. 260—163)

This invention relates to new azo colouring matters and more particularly to new azo colouring matters which are especially valuable for colouring plastics.

According to our invention we provide as new azo colouring matters the metallic salts of 1-phenyl-, or 1-tolyl-3-methyl-4-(3'-chloro-6'-carboxyphenylazo)-5-pyrazolone.

The new colouring matters are thus the metallic salts of the carboxylic acids of the formula:

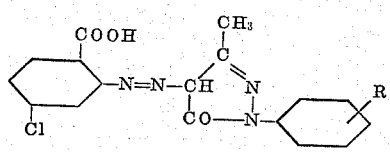

wherein R represents a hydrogen atom or a methyl group.

The metallic salts of our invention include not only the salts of the usual laking metals such as for example, calcium, barium, strontium, magnesium, zinc, lead, manganese and aluminium, but also the sodium and potassium salts.

We have found that the calcium and strontium salts are especially valuable colouring matters.

The new sodium or potassium salts may be made by coupling diazotised 4-chloroanthranilic acid with the 1-phenyl, or 1-tolyl-3-methyl-5-pyrazolone in the presence of caustic soda or caustic potash. The new salts of other metals are conveniently made by stirring a suspension of the new sodium salt in an aqueous solution of a soluble salt of the appropriate metal. For example the new calcium salts may be made by stirring a suspension of the new sodium salt with an aqueous solution of calcium chloride at 60° C. However it will be apparent that the new salts of these other metals can be obtained directly by carrying out the azo coupling in the presence of a soluble salt of the appropriate metal.

The new colouring matters may be rosinated by conventional methods.

As already indicated the new colouring matters are especially valuable for colouring plastics, and according to a further feature of our invention therefore we provide a process for colouring plastics by mixing the plastic with a metallic salt of 1-phenyl- or 1-tolyl-3-methyl(3'-chloro-6'-carboxyphenylazo)-5-pyrazolone.

The mixing may be carried out by masticating the heated plastic (in the presence or in the absence of plasticizers), with the new colouring matter, and the coloured resin thus obtained may be cooled, disintegrated and moulded into any desired shape or form. If desired, liquids such as for example, ethanol, water or acetone may be added to the mixture of plastic and colouring matter to facilitate the production of a homogeneously coloured plastic mass.

Among the plastics which may be satisfactorily coloured with our new colouring matters there may be mentioned those comprising polyethylene, polystyrene, phenol-formaldehyde and urea-formaldehyde condensates, acrylate resins, for example polymethyl-methacrylate, and cellulose ethers and esters, for example cellulose acetate.

The colouring matters of our invention when used for the colouration of plastics have high tinctorial strength and give attractive transparent yellow shades combined with good fastness to heat, rubbing and migration and with good fastness to light, and they are superior to hitherto-known substantially insoluble pigments of similar transparent yellow shade in possessing this combination of properties. The calcium and strontium salts are especially valuable because they are readily dispersed in plastics to give transparent yellow shades of good heat stability and superior light fastness and they do not readily "bleed" or migrate from the plastic onto adjacent materials. Translucent and opaque shades can be obtained by using mixtures of a white pigment, for example titanium oxide and the new colouring matters.

The invention is illustrated but not limited by the following examples in which the parts are by weight:

Example 1

8.6 parts of 4-chloroanthranilic acid are added to 200 parts of water at 0° C., and 10.5 parts of 35% hydrochloric acid are added. 3.6 parts of sodium nitrite dissolved in 18 parts of water are then added during 30 minutes. The diazo solution so obtained is added to a solution of 8.7 parts of 1-phenyl-3-methyl-5-pyrazolone and 4.5 parts of caustic soda in 200 parts of water at 10° C. The sodium salt of the azo compound so formed, which is almost insoluble in water, is filtered off and dried at 60° C.

Example 2

In place of the 8.7 parts of 1-phenyl-3-methyl-5-pyrazolone used in Example 1, there may be used 9.4 parts of 1-p-tolyl-3-methyl-5-pyrazolone. A similar sodium salt which is almost insoluble in water is obtained.

Example 3

8.6 parts of 4-chloroanthranilic acid are added to 200 parts of water at 0° C. and 10.5 parts of 35% hydrochloric acid are added. 3.6 parts of sodium nitrite dissolved in 18 parts of water are then added during 30 minutes. The diazo solution so obtained is added to a solution of 8.7 parts of 1-phenyl-3-methyl-5-pyrazolone and 4.5 parts of caustic soda in 200 parts of water at 10° C. The sodium salt of the azo compound is filtered off and added to 500 parts of water. 12 parts of calcium chloride flake (CaCl$_2$.2H$_2$O) are dissolved in 60 parts of water and the solution is added to the suspension of the sodium salt of the azo compound. The suspension of pigment so formed is heated to 60° C. and filtered. The filter-cake is washed with water, dried at 60° C., and ground. The calcium lake so obtained is a bright yellow powder.

*Example 4*

In place of the 12 parts of calcium chloride flake dissolved in 60 parts of water used in Example 3 there are used 22 parts of strontium chloride (SrCl$_2$.6H$_2$O) dissolved in 100 parts of water. The strontium lake so obtained is a yellow powder.

*Example 5*

0.1 part of the colouring matter prepared according to Example 3 is mixed with 100 parts of polystyrene in the form of chips. The mixture is melted and masticated in the molten condition. The coloured resin so obtained is cooled and disintegrated. The powder is moulded to give a transparent yellow coloured plastic material with good light fastness and stability.

*Example 6*

In place of 0.1 part of colouring matter used in Example 5, there is used a mixture of 0.02 part of colouring matter and 0.5 part of titanium dioxide. A plastic material of a yellow pastel shade is obtained.

*Example 7*

0.1 part of the pigment prepared according to Example 3 is thoroughly mixed with 68 parts of cellulose acetate and 32 parts of dimethyl phthalate. The mixture is masticated on heated rollers. The plastic mass thus obtained is cooled and disintegrated and the product is moulded to give a transparent plastic material.

Opaque, pastel and translucent shades may be obtained by adding titanium dioxide in addition to the colouring matter.

In place of the dimethyl phthalate, other suitable plasticizers may be used and ethyl alcohol, water or acetone may be added in suitable proportion to facilitate mixing.

What we claim is:

1. As azo coloring matters, the metallic salts of the carboxylic acids of the formula

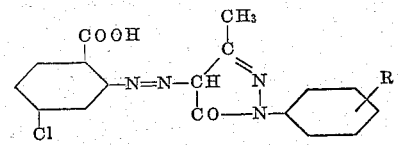

wherein R is a radical selected from the group consisting of hydrogen and methyl, said salts being characterized by their substantial insolubility in water and organic solvents.

2. As azo coloring matters, the metallic salts of 1 - phenyl - 3 - methyl - 4 - (3' - chloro - 6'-carboxyphenylazo)-5-pyrazolone, said salts being characterized by their substantial insolubility in water and organic solvents.

3. As azo coloring matters, the metallic salts of 1 - tolyl - 3 - methyl - 4 - (3' - chloro - 6' - carboxyphenylazo)-5-pyrazolone, said salts being characterized by their substantial insolubility in water and organic solvents.

4. The azo coloring matters of claim 1, wherein said metallic salts are calcium salts.

5. The azo coloring matters of claim 1, wherein said metallic salts are strontium salts.

References Cited in the file of this patent

UNITED STATES PATENTS

| Number | Name | Date |
|---|---|---|
| 1,149,231 | Wagner et al. | Aug. 10, 1915 |
| 1,822,044 | Krizikalla et al. | Sept. 8, 1931 |
| 1,877,615 | Straub et al. | Sept. 13, 1932 |
| 1,895,559 | Straub et al. | Jan. 31, 1933 |
| 1,962,226 | Woodward | June 12, 1934 |
| 2,048,898 | Straub et al. | July 28, 1936 |
| 2,230,686 | Holzach et al. | Feb. 4, 1941 |
| 2,565,898 | Widmer et al. | Aug. 28, 1951 |